Patented July 13, 1926.

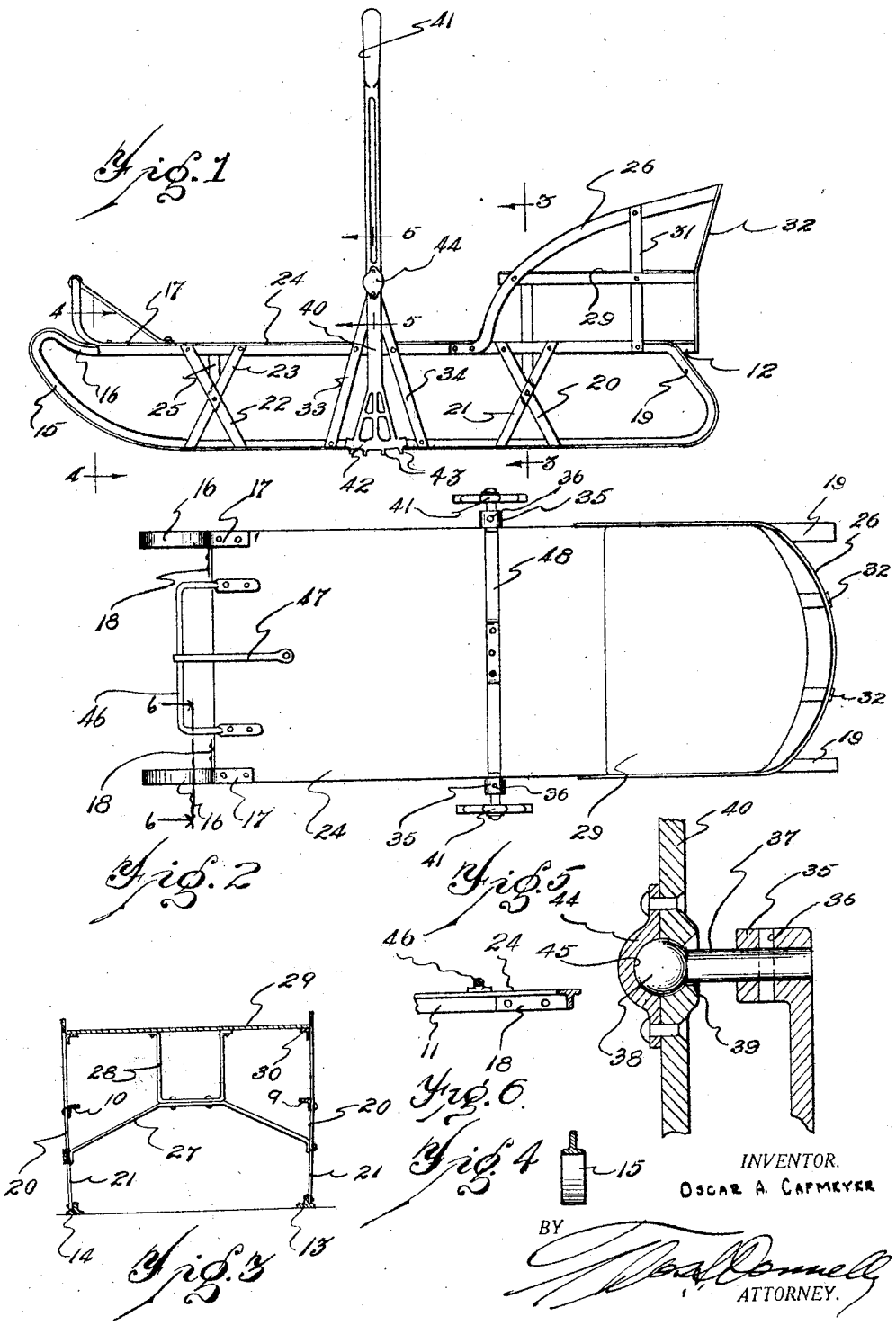

1,592,555

UNITED STATES PATENT OFFICE.

OSCAR A. CAFMEYER, OF DETROIT, MICHIGAN.

SLED.

Application filed September 26, 1925. Serial No. 58,726.

My invention relates to a new and useful improvement in a sled arranged and constructed for being propelled by the occupant of the sled. It is an object of the present invention to provide a sled of this class, which will be simple of structure, economical of manufacture and highly efficient in use.

Another object of the invention is to provide a sled formed from a minimum number of parts, so arranged and constructed as to be durable, while at the same time quite light.

Another object of the invention is the provision in a sled of a propelling mechanism operable by the occupant of the sled for propelling the vehicle forwardly, so arranged and constructed that the propelling means which engage the ground may be lifted clear from the ground upon the return movement.

Another object of the invention is the provision of an arrangement for mounting propelling means of the class mentioned on a sled.

Other objects will appear hereinafter.

The invention consists in the combination and arrangement of parts hereinafter described and claimed.

The invention will be best understood from a reference to the accompanying drawings, which form a part of this specification and in which, Fig. 1 is a side elevational view of the invention, Fig. 2 is a top plan view of the invention, Fig. 3 is a sectional view, taken on substantially line 3—3 of Fig. 1, Fig. 4 is a sectional view, taken on substantially line 4—4 of Fig. 1, Fig. 5 is a fragmentary sectional view, taken on substantially line 5—5 of Fig. 1, Fig. 6 is a fragmentary sectional view, taken on substantially line 6—6 of Fig. 2.

In the drawings, I have shown the sled as constructed from metal, although, as the description proceeds, it will, it is believed, appear obvious that the principles of the invention may be used with the substitution of different kinds of material for various parts.

A frame is provided which is formed substantially rectangular having side rails 9 and 10 and end rails 11 and 12. This frame is shown constructed from angle iron and the side 12 is formed arcuate for obvious purposes. Runners 13 and 14 are provided, each of which is bowed upwardly at the forward end as at 15, and having the rearwardly directed portion 16. These runners are formed from T iron and the arms of the T are extended and secured at the forward end to the upper surface of the side rails, as at 17. The trunk of the T is angularly bent and secured to the outer surface of the end rail, as at 18. The rear end of these runners has a forwardly directed portion 19, the connection of this forwardly directed portion with the frame being as already described for the forward end of the runner. Each of the runners is braced to the frame by braces 20, 21, 22 and 23. Mounted on the upper surface of the frame at the forward portion thereof is a sheet metal covering 24, the braces 22 and 23 being braced to the cover 24 by a bow-shaped brace 25. Secured at its opposite ends to the outer surface of the side rails 9 and 10 is a piece of strap metal 26, which serves to form the back rail for the seat.

The braces 21 and 20, at opposite sides of the frame, are braced together by the bow-shaped brace 27, which connects to a U-shaped brace 28 attached at the ends of its legs to a seat plate 29, which is mounted upon the upper surface of an angle iron formed into a C, this angle iron being connected to the back rail 26 of the seat and the side rails of the frame by means of the braces 31 and 32.

At opposite sides of the frame are inverted V-shaped supporting members, the arms 33 and 34 being attached to the runners and the side rails of the frame. Projecting outwardly from the outer face of these V-shaped supporting members is a tubular boss 35 having on opening 36 extending diametrically of the opening formed in the boss. These V-shaped supporting members are preferably formed from a forging. Inserted into the opening formed in the boss 35 and keyed therein by a pin projected through the opening 36 is an axle 37 having a spherical head 38 formed on its free end. This axle is projected through an elongated slot 39 formed in the propelling arm 40, the upper end of which is provided with a hand grip 41 and the lower end of which is provided with a segment 42, from the undersurface of which project calks or gripping members 43. A plate 44 is secured to the outer surface of the propelling arm 40 having a semi-spherical recess 45 formed on its inner surface to accommodate the spherical head 38.

Mounted on the plate 24, at the forward end thereof, is a foot rest 46, which is formed U-shaped and secured at the ends of its legs to the plate 24. A brace 47 serves to strengthen the mounting of this foot rest on the plate 24. A bow-shaped brace 48 serves to connect the V-shaped supporting members at their upper ends to the plate 24, adjacent the center thereof.

In operation, the one using the sled would seat himself on the seat plate 29. By gripping the propelling arms at the hand gripping portion 41, the operator may rock these arms on their mountings and by pressing the upper end of the arms forwardly, cause a forward propelling of the sled on account of the engagement of the gripping members 43 with the ground over which passed. When the propelling stroke has been completed and the operator desires to return to the initial position, the arms 41 may be rocked inwardly toward each other, on account of the mountings on the head 38. After the arms have been rocked forwardly of each other, they may be moved to the initial position. The mounting of the arms 40 on the head 38 will permit their movement inwardly of each other, but a lateral movement is prevented on account of the formation of the slot 39, which extends vertically, so that a twisting of the arms 40 in the hands of the operator is prevented. The propelling of the vehicle is effected by the operator in much the same manner that a boat is rowed, excepting that the operation is reversed, the propelling being effected by a pushing of the propelling arms instead of a pulling. The slot is so arranged that the arms move inwardly toward each other at the upper end only. The length of this slot is also such that the upper ends of the arms 40 cannot meet.

With a device of this class, it is possible for the person occupying the sled to propel himself forwardly at considerable speed and on account of the structure of the sled, the resistance to forward movement is reduced to a minimum.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. A sled of the class described, comprising a frame and a pair of runners formed from T iron, attached to said frame at their opposite ends, the arms of said T iron being attached to a horizontal surface of said frame and the trunk of said T iron being attached to a vertical surface of said frame.

2. A sled of the class described, comprising a frame; a pair of runners formed from T iron, each attached at its opposite ends to said frame, the arms of said T iron being attached to a horizontal surface of said frame and the trunk of said T iron being attached to a vertical surface of said frame; a supporting member mounted on said frame for supporting the user of said sled; and propelling means mounted on said sled, operable at will by the user thereof.

3. A sled of the class described, comprising a frame; a pair of runners mounted on said frame; a seat mounted on said frame; a pair of supporting members mounted on said frame at opposite sides thereof; a pair of propelling arms, each having an elongated slot formed on one side communicating with a spherical recess formed on the other side; a pin mounted on said supporting members and carrying a spherical head, said pin being projected through said sled and said head engaging in said spherical recess; and a plate mounted on said arm for preventing movement of said arm longitudinally of said pins.

4. A sled of the class described, comprising a frame; a pair of runners mounted on said frame at opposite sides thereof; a pair of inverted V-shaped supporting members mounted on said frame at opposite sides thereof; a tubular boss projecting outwardly from said supporting members at the apex thereof; propelling arms, each of said propelling arms having an elongated slot formed on the inner face and a spherical recess formed on the outer face, communicating with said slot; a pin projected through said slot and engaging in said tubular boss; means for preventing rotation of said pin in said boss; a spherical head mounted on the free end of said pin and engaging in said spherical recess in said arms; a plate mounted on said arms and provided with a spherical recess for engaging the outer portion of said head for preventing longitudinal movement of said arms relatively to said pins; an arcuate portion formed on the lower end of each of said arms; and gripping members projecting outwardly from the undersurface of said arcuate portion, said arms being rockable on said pins in a vertical plane and movable inwardly of each other from a vertical plane.

In testimony whereof, I have signed the foregoing.

OSCAR A. CAFMEYER.